United States Patent
Yamamoto et al.

(10) Patent No.: US 11,312,297 B2
(45) Date of Patent: Apr. 26, 2022

(54) HAPTIC COMMUNICATION FOR REMOVING INTERRUPTIONS

(71) Applicant: Honda Motor Co., Ltd., Tokyo (JP)

(72) Inventors: Stuart Masakazu Yamamoto, La Mirada, CA (US); Joseph Anthony Alequin, Los Angeles, CA (US); Matias Monges, Los Angeles, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 73 days.

(21) Appl. No.: 16/124,266

(22) Filed: Sep. 7, 2018

(65) Prior Publication Data

US 2020/0079288 A1 Mar. 12, 2020

(51) Int. Cl.
  *B60Q 9/00* (2006.01)
  *G08B 21/18* (2006.01)
  *H04W 4/48* (2018.01)

(52) U.S. Cl.
  CPC ............ *B60Q 9/00* (2013.01); *G08B 21/182* (2013.01); *H04W 4/48* (2018.02)

(58) Field of Classification Search
  CPC .......... B60Q 9/00; G08B 21/182; H04W 4/48
  USPC ................... 340/425.5, 426.1, 539.1, 539.11
  See application file for complete search history.

(56) References Cited

U.S. PATENT DOCUMENTS

| | | | |
|---|---|---|---|
| 5,963,877 A * | 10/1999 | Kobayashi | H04M 19/04 455/14 |
| 6,408,187 B1 | 6/2002 | Merriam | |
| 6,424,888 B1 * | 7/2002 | Sone | H04M 1/576 348/14.01 |
| 8,285,339 B2 | 10/2012 | Shin | |
| 8,660,248 B2 | 2/2014 | Cheethirala | |
| 9,203,634 B2 | 12/2015 | Tsukiji | |
| 9,390,599 B2 | 7/2016 | Weinberg et al. | |
| 9,489,966 B1 * | 11/2016 | Hassani | G10L 25/63 |
| 9,628,612 B2 | 4/2017 | Flamini et al. | |
| 10,059,228 B1 * | 8/2018 | Aikin | B60N 2/0276 |
| 2003/0013495 A1 | 1/2003 | Oleksy | |
| 2007/0100525 A1 | 5/2007 | Mattes et al. | |
| 2014/0309864 A1 * | 10/2014 | Ricci | A61B 5/4809 701/36 |
| 2015/0256276 A1 * | 9/2015 | Jones | H04H 60/65 455/3.01 |

(Continued)

FOREIGN PATENT DOCUMENTS

EP 2431245 3/2012

*Primary Examiner* — Daryl C Pope
(74) *Attorney, Agent, or Firm* — Rankin, Hill & Clark LLP

(57) ABSTRACT

A vehicle system and related methods include a sensor, a vehicle computing device (VCD), and a haptic device. The sensor is operable to sense an occurrence or a non-occurrence of a predetermined in-vehicle event. The VCD is in communication with the sensor, and detects a communication signal sent to an in-vehicle mobile device that is capable of receiving the communication signal. The VCD is in communication with the haptic device to actuate the haptic device to provide a haptic signal. If the sensor senses the occurrence of the predetermined in-vehicle event, then the haptic device gives a haptic indication of the communication signal to the occupant. The predetermined in-vehicle event is thereby not interrupted by the haptic indication, and can proceed until the occupant chooses if and when to respond to the communication signal.

18 Claims, 3 Drawing Sheets

(56) References Cited

U.S. PATENT DOCUMENTS

2016/0205238 A1* 7/2016 Abramson ......... G01C 21/3641
455/456.4
2017/0043782 A1* 2/2017 Farrell ................. B60W 40/08
2019/0237092 A1* 8/2019 Norton ................. G10L 21/034

* cited by examiner

HAPTIC COMMUNICATION FOR REMOVING INTERRUPTIONS

BACKGROUND

Conversations between occupants of a vehicle can be disturbed by any number of interruptions, distractions, or diversions. These interruptions include telephone calls or text messages sent to a mobile phone of one of the occupants. Interruptions can be detrimental to the flow of the conversation and can ultimately cause the conversations to end.

BRIEF DESCRIPTION

According to one aspect, a vehicle system for providing indication to an occupant of a vehicle includes a sensor sensing an occurrence or a non-occurrence of a predetermined in-vehicle event; a detector in communication with the sensor, and detecting a communication signal sent to an in-vehicle receiver; and a haptic device in communication with the detector. If the sensor senses the occurrence of the predetermined in-vehicle event, the haptic device gives a haptic indication of the communication signal to the occupant.

According to another aspect, a method of providing an indication to an occupant of a vehicle includes providing a vehicle system including a sensor, a haptic device, and a detector in communication with the sensor and the haptic device. The detector detects whether a communication signal is sent to an in-vehicle receiver and a sensor senses whether a predetermined in-vehicle event is occurring. If the detector detects the communication signal is sent to the in-vehicle receiver and the sensor senses the predetermined in-vehicle event is occurring, then the haptic device provides a haptic indication of the communication signal to the occupant.

DETAILED DESCRIPTION

Generally, the systems and methods disclosed herein provide, under certain conditions, haptic indications of an incoming communication signal sent to a mobile device belonging to a vehicle occupant. The haptic indications are given to the vehicle occupant in order to not interrupt a conversation or other predetermined event that is occurring in the vehicle when the incoming communication signal is received by the mobile device. The methods and systems are described herein as applying to a vehicle system. However, the functions and components of the vehicle system can be reorganized into different architectures and/or implemented in other scenarios, architectures, modes, and embodiments where a conversation or other predetermined event is occurring, such as a home, a movie theater or a music venue for example. Further, it is understood that other functions, components or modes could be integrated into the vehicle system.

Figure 1:
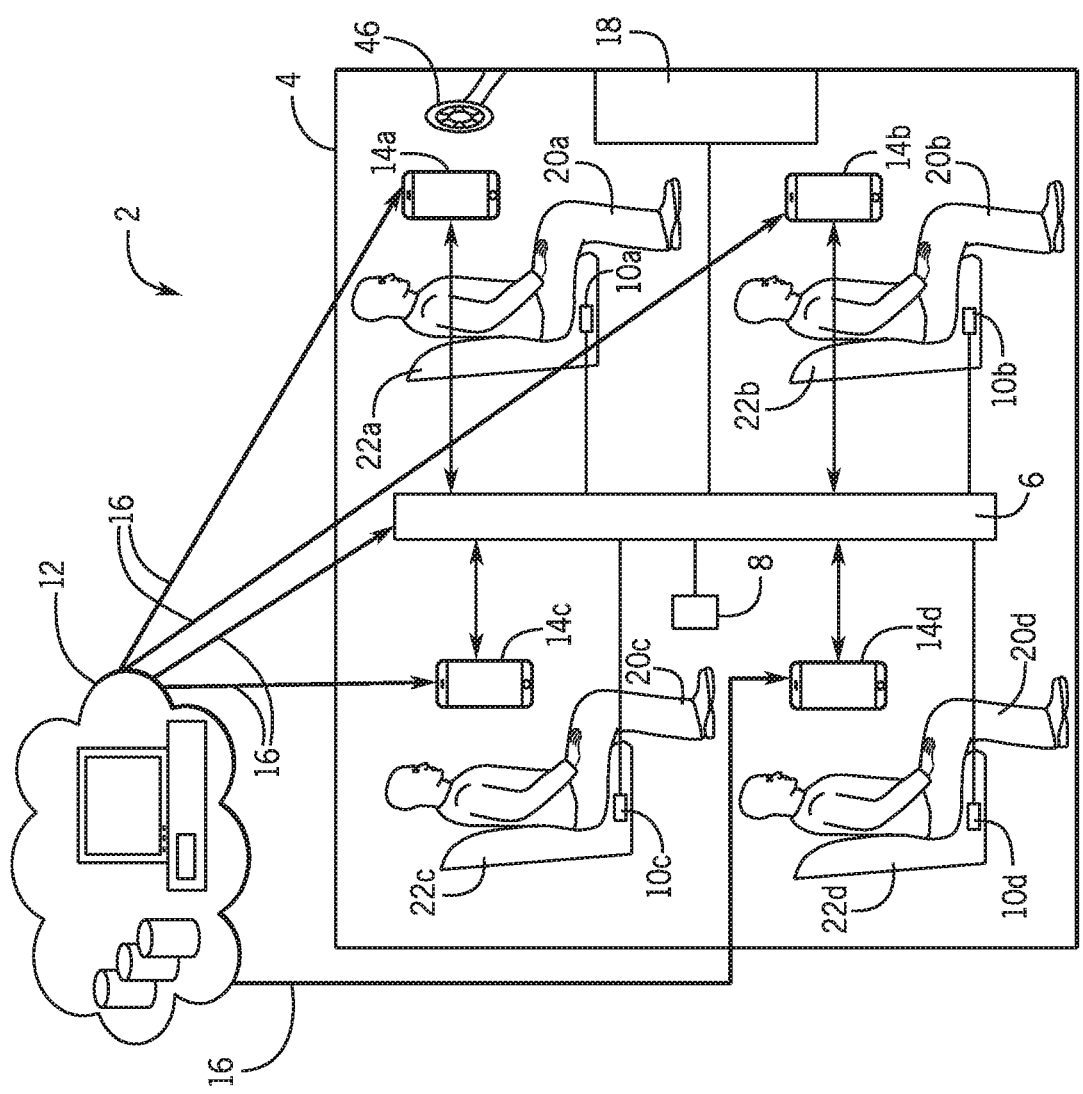
FIG. 1 is a schematic diagram of a vehicle system for providing an indication to an occupant of a vehicle according to an exemplary embodiment.

Referring now to the figures, a vehicle system 2 is arranged in a vehicle 4 and includes a vehicle computing device 6 (VCD), a sensor 8, and one or more haptic devices 10a-10d. The vehicle system 2 interacts with a network 12 and portable communication devices, e.g. mobile devices 14a-14d, which can receive an incoming communication signal 16 from the network 12. Optionally, the mobile devices 14a-14d are included as part of the vehicle system 2. The mobile devices may be mobile telephones for example, or other mobile communication devices that are capable of receiving the incoming communication signal 16 from the network 12. In this way, the mobile devices 14a-14d operate as in-vehicle receivers of the communication signal 16 and are the intended targets of the incoming communication signal 16. The mobile devices 14a-14d may be respectively associated with one or more respective occupants 20a-20d of the vehicle 4, who can be the intended recipients of the communication signal 16. As depicted in FIG. 1, the occupants 20a-20d respectively occupy, and thereby are respectively associated with, one or more seats 22a-22d of the vehicle 4. Although four haptic devices 10a-10d are depicted in FIG. 1, this is not required and the vehicle system 2 may include any number of haptic devices, such as including only one haptic device or more than four. The same is true for the number of mobile devices 14a-14d, occupants 20a-20d, and seats 22a-22d.

The incoming communication signal 16 may comprise a wireless communication signal such as a telephone call, text message, or other type of wireless communication sent to the one or more mobile devices 14a-14d. Other types of communication signals 16 that can be sent to the mobile devices 14a-14d may include an alert (e.g. email) received using one or more mobile applications (e.g. email application) of the mobile devices 14a-14d. In FIG. 1, the communication signal 16 is depicted as being sent wirelessly from the network 12 directly to the mobile devices 14a-14d, however, this is not required. In accordance with the present subject matter, the communication signal 16 may be sent from the network 12, but may also be sent from another source that is either external or internal (e.g. from one of the other mobile devices 14a-14d) to the vehicle 4. Additionally, the communication signal 16 may be sent directly to one or more of the mobile devices 14a-14d, or indirectly to the mobile devices 14a-14d, optionally through the VCD 6.

The VCD 6 includes provisions for processing, communicating and interacting with various components of the vehicle 4 and vehicle system 2, including the sensor 8, the haptic devices 10a-10d, and an in-vehicle infotainment system 18, and with other components or systems including the network 12 and mobile devices 14a-14d.

In one embodiment, the VCD 6 can be implemented within the vehicle 4 as part of a telematics unit, a head unit, a navigation unit, the infotainment system 18, or an electronic control unit, among others. Generally, the VCD 6 includes a processor, a memory, and optionally an input/output (I/O) interface, which are each operably connected for communication with each other via a bus and/or other wired and wireless technologies.

The VCD 6 is in communication with the mobile devices 14a-14d through wired or wireless technologies for example. The VCD 6 is operable to detect the incoming communication signal 16 sent to one or more of the mobile devices 14a-14d, thereby operating as a detector of the communication signal 16. The VCD 6 may be operable to detect the communication signal 16 through communication directly between the VCD 6 and the network 12 and/or through communication between the VCD 6 and the mobile devices 14a-14d.

The VCD 6 is also in communication with the sensor 8 through wired or wireless technologies. The VCD 6 is thus operable to receive sensed data from the sensor 8 in order to determine the occurrence of non-occurrence of a predetermined in-vehicle event. The VCD 6 is in communication with the haptic devices 10a-10d through wired or wireless technologies, so as to allow the VCD 6 to control operation of the haptic devices 10a-10d. The VCD 6 may also be in communication with the infotainment system 18 through wired or wireless technologies.

The VCD 6, through communication with the mobile devices 14a-14d and/or through data received in the communication signal 16, may be operable to determine which one or more of the mobile devices 14a-14d are the intended targets of the communication signal 16. This determination may be made using data such as device association with a particular seat 22a-22c, signal strength of each of the mobile devices 14a-14d, proximity of the mobile devices 14a-14d to a respective one of the seats 22a-22d, or by other data.

The sensor 8 is operable for sensing an occurrence or non-occurrence of a predetermined in-vehicle event. In other words, the sensor senses whether or not the predetermined in-vehicle event is occurring. The predetermined in-vehicle event can be programmed into the VCD 6 for example, by the vehicle manufacturer or by an operator or an occupant 20a-20d of the vehicle 4. The predetermined in-vehicle event can include, but is not limited to, a verbal conversation between two people, or output from an infotainment system 18. The conversation may be occurring between two of the occupants 20a-20d of the vehicle 4, or between one of the occupants 20a-20d of the vehicle 4 and a non-occupant of the vehicle 4. The output from the infotainment system 18 may include an audio output (e.g. music provided by a stereo system or audible directions provided by a navigation system), an audio-visual output (e.g. a movie or television broadcast), or other audible sounds produced by the infotainment system 18 or other audio component in the vehicle 4.

The sensor 8 is operable to sense whether the predetermined in-vehicle event is occurring by sensing a measurement of data associated with the predetermined in-vehicle event. The sensor 8 generates one or more data signals indicating such measured data. These data signals are delivered to the VCD 6 so the VCD 6 can determine if the predetermined in-vehicle event is occurring. These data signals can be converted into other data formats (e.g., numerical) and/or used by the VCD 6 to generate other data metrics and parameters.

The sensor 8 is not particularly limited, and can comprise one or more sensors. The sensor 8 can include any type of sensor, for example, acoustic, electric, environmental, optical, imaging, light, pressure, force, thermal, temperature, proximity, among others.

In one embodiment, the sensor 8 includes a microphone that senses ambient sounds that are produced within the vehicle 4 as a result of the conversation or as a result of the output from the infotainment system 18. The sensed sounds may be transmitted to the VCD 6, which may be operable to process the sensed sounds as data in order to determine that a conversation is occurring within the vehicle 4 or that an audio output or an audio-visual output is generated by the infotainment system 18 within the vehicle 4.

In another embodiment, the sensor 8 may include a component, module, or operation that is included as part of the VCD 6. In this embodiment, the sensor 8 may be operable to detect operation of the infotainment system 18 directly by communication between the infotainment system 18 and the VCD 6, and without necessarily having to use a microphone to sense ambient sounds that are output by the infotainment system 18. In this embodiment, the sensor 8 may operate as part of the VCD 6 to detect, for example, an amount of power delivered to operate the infotainment system 18 in order to detect that the infotainment system 18 is operating to output ambient sound in the vehicle 4. This embodiment may be included, in addition to, or instead of including the microphone.

The sensor 8 may also comprise other sensors associated with the vehicle system 2, which can include, but are not limited to, cameras mounted to the interior or exterior of the vehicle that may be operable record movement of mouths or hand gestures of the occupants 20a-20d. Such mouth movement and/or hand gestures can be identified by the VCD 6 as being indicative of the conversation, thereby allowing the VCD 6 to identify the occurrence or non-occurrence of the conversation instead of, or in addition to using sensed ambient sounds. Other sensors can include motion sensors, light sensors, radar sensors, and laser sensors.

The haptic devices 10a-10d are separate and distinct from the mobile devices 14a-14d, and as depicted in FIG. 1 are arranged in the vehicle seats 22a-22b. The haptic devices 10a-10d can be arranged in different locations than those depicted in FIG. 1, such as in other areas of the vehicle 4 or vehicle seats 22a-22b. More than one haptic device can be included in each of the seats 22a-22d, and the haptic devices 10a-10d can be included in/on other components of the vehicle, such as a steering wheel 46 or an arm rest.

The haptic devices 10a-10d are in communication with the VCD 6 so that the VCD 6 can selectively actuate one or more of the haptic devices 10a-10d under certain conditions, in order to generate a haptic indication that is perceptible by one or more of the occupants 20a-20d. The haptic devices 10a-10d are operable to generate a haptic indication of the communication signal 16, which is provided to one or more of the occupants 20a-20d who are the intended recipient of the communication signal 16. The haptic devices 10a-10d may be operable to provide haptic indications including vibration, pressure, heating, cooling, ultrasound, air movement, other tactile indicators, or combinations thereof to one or more of the occupants 20a-20d.

In one embodiment, the haptic devices 10a-10d deliver vibration to one or more of the occupants 20a-20b when actuated by the VCD 6. In this embodiment, the haptic devices 10a-10d can each include an eccentric rotating mass, a linear resonant actuator, a piezoelectric actuator, a magnetic actuator, or other vibration generating mechanisms. The haptic devices 10a-10d can be arranged in the vehicle 4 so as to provide the vibration that can be felt by one or more of the occupants 20a-20b. To accomplish this, the haptic devices 10a-10d can be situated in the vehicle seats 22a-22b, which are respectively occupied by the occupants 20a-20d as depicted in FIG. 1 for example. In this way, the mobile devices 14a-14d, which are respectively associated with the occupants 20a-20d, are therefore respectively associate with the haptic devices 10a-10d.

Figure 2:
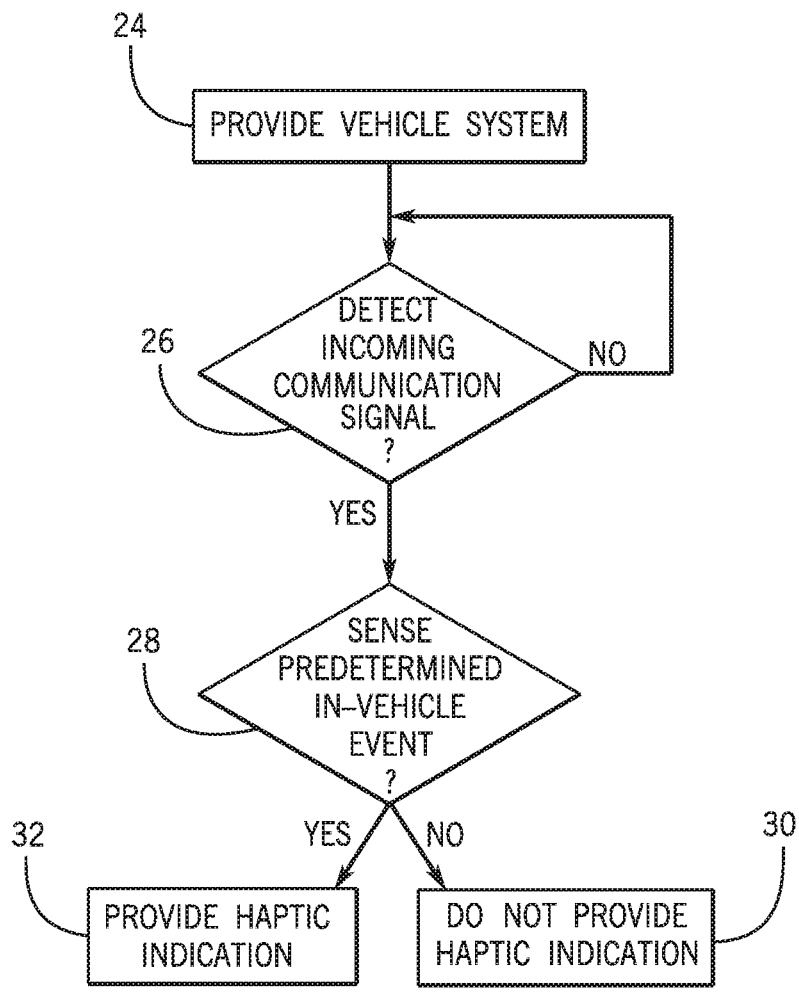
FIG. 2 is a process flow diagram of a method of providing an indication to a vehicle occupant according to an exemplary embodiment.

With reference to FIG. 2, a method of providing an indication to one or more of the occupants 20a-20d of the vehicle 4 includes at 24 providing the vehicle system 2 including the sensor 8, one or more haptic devices 10a-10d, and the VCD 6 (i.e. detector). The VCD 6 is operable as a detector of the communication signal 16, and at 26 detects whether an incoming communication signal 16 is sent to one or more of the mobile devices 14a-14d, which are operable as in-vehicle receivers of the communication signal 16. The in-vehicle receivers can include other devices capable of receiving the incoming communication signal 16, such as tablets, telephones, computers, or the like that are separate from, or integral to the vehicle 2 or vehicle system 4. If a communication signal 16 is not detected, the VCD 6 repeats step 26 and continues to detect for an incoming communication signal 16.

At 28, the sensor 8 senses whether a predetermined in-vehicle event is occurring, e.g. whether a conversation is occurring or whether the infotainment system 18 is outputting sound. Steps 26 and 28 can be performed in any order or simultaneously.

If a communication signal 16 that is sent to the mobile devices 14a-14d is detected at 26, and if the sensor 8 does not sense a predetermined in-vehicle event occurring, then at 30 the haptic devices 10a-10d do not generate a haptic indication of the communication signal 16. A haptic indication is not needed because there is no predetermined in-vehicle event that would be interrupted by an audible indication of the incoming communication signal 16. Instead of a haptic indication being generated by the haptic devices 10a-10d, an audible indication of the incoming communication signal 16 can be generated by one or more of the mobile devices 14a-14d that are the intended targets of the communication signal 16, and/or by the infotainment system 18. For this purpose, the infotainment system 18 may include an audio device, such as a speaker that can produce audible noises.

This audible indication can be given to one or more of the occupants 20a-20d who are the intended recipients of the communication signal 16. The audible indication will not interrupt any predetermined in-vehicle events because none are occurring.

If a communication signal 16 that is sent to the mobile devices 14a-14d is detected at 26, and if the sensor 8 does sense the predetermined in-vehicle event occurring, then at 32 one or more of the haptic devices 10a-10d generate a haptic indication of the communication signal 16. The haptic devices 10a-10d can be actuated by the VCD 6 to generate the haptic indication, which is given to one or more of the occupants 20a-20d who are the intended recipients of the communication signal 16 to alert them of the incoming communication signal 16. The predetermined in-vehicle event is therefore not interrupted by an audible indication of the communication signal 16, because only a haptic indication is given by one or more of the haptic devices 10a-10b. The predetermined in-vehicle event can then proceed until the intended recipient chooses if and when to respond to the communication signal.

Figure 3:
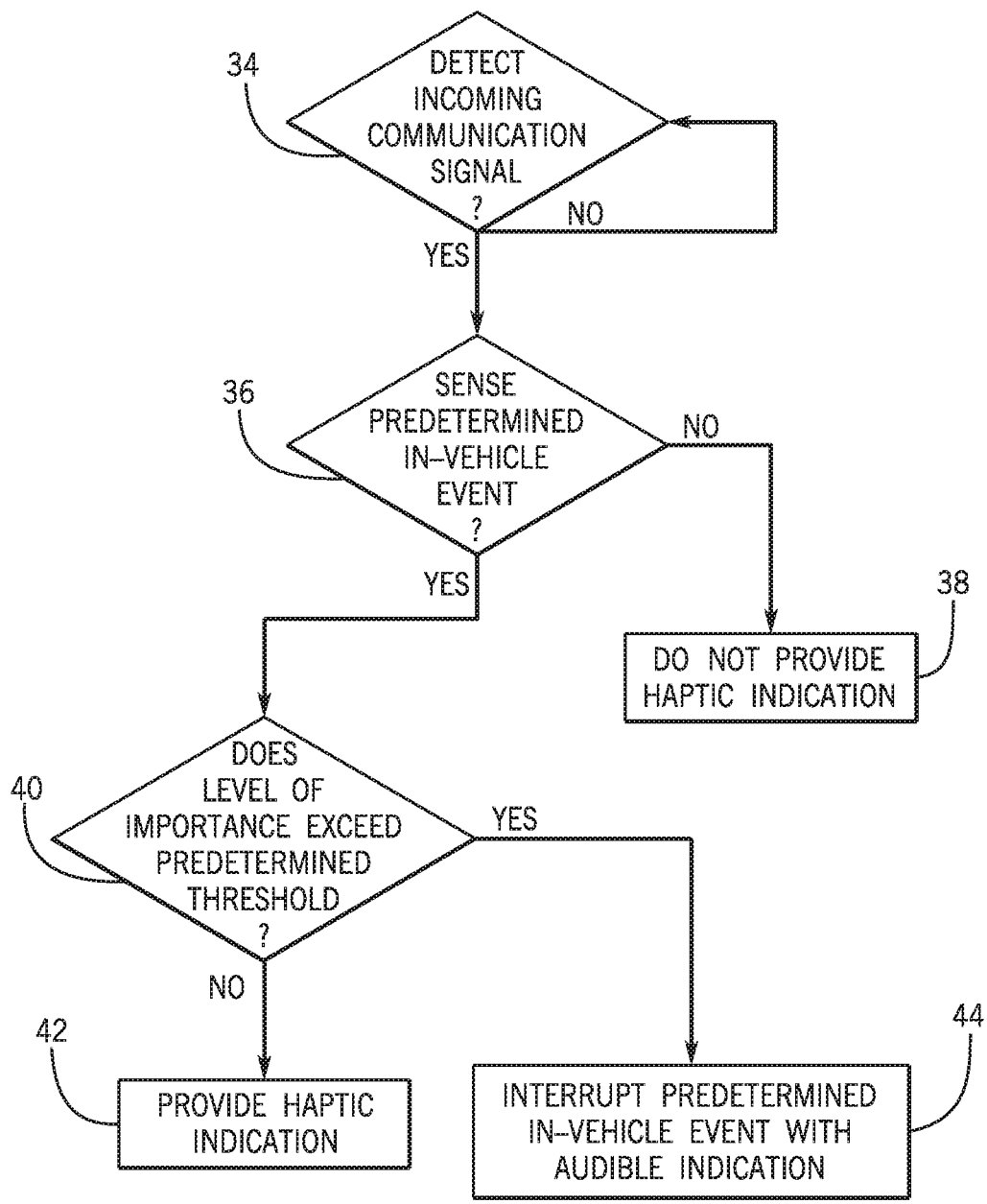
FIG. 3 is a process flow diagram of another method of providing an indication to a vehicle occupant according to an exemplary embodiment.

With reference to FIG. 3, a method of providing an indication to one or more of the occupants 20a-20d of the vehicle 4 includes at 34 detecting an incoming communication signal 16. As with the method of FIG. 2, the VCD 6 detects whether an incoming communication signal 16 is sent to one or more of the mobile devices 14a-14d. If a communication signal 16 is not detected, the VCD 6 repeats step 34 and continues to detect for an incoming communication signal 16. At 36, the sensor 8 senses whether a predetermined in-vehicle event is occurring. Steps 34 and 36 can be performed in any order or simultaneously.

If the VCD detects that a communication signal 16 is sent to one or more of the mobile devices 14a-14d, and the sensor 8 does not sense the predetermined in-vehicle event occurring, then the haptic devices 10a-10b at 38 do not give a haptic indication of the communication signal 16 to the occupants 20a-20b. In this scenario, the mobile devices 14a-14d that are the target of the communication signal 16, or the infotainment system 18, or both may generate an audible indication of the communication signal 16. Like for the method of FIG. 2, the audible indication does not interrupt any predetermined in-vehicle events because none are occurring.

If the VCD detects that a communication signal 16 is sent to one or more of the mobile devices 14a-14d, and the sensor 8 does sense the predetermined in-vehicle event occurring, then at 40 it is determined if a level of importance of the communication signal 16 exceeds or satisfies (i.e. equals) a predetermined threshold.

The level of importance of the communication signal 16 may be determined or assigned by the VCD 6, by one of the mobile devices 14a-14d, by the network 12, or by the intended recipient of the communication signal 16. The level of importance of the communication signal 16 may be determined using a characteristic of the communication signal 16. The level of importance may be determined based on the identity of the source of the communication signal 16. In one embodiment, the communication signal 16 can have a higher or lower level of importance based on the identity of the person or entity (i.e. the source) that initiates a telephone call or sends a text message to the one or more mobile devices 14a-14d. For example, a communication signal 16 sent by a source that is a well-known friend of the intended recipient may have a relatively higher level of importance than a communication signal 16 sent by a source that is a distant acquaintance of the intended recipient. The level of importance of the communication signal 16 may be assigned by one or the occupants 20a-20d owning the target mobile device. The level of importance may be determined in accordance with other factors such as the number of communications on the mobile device conducted between the intended recipient and the source prior to the communication signal 16 being sent, where more communication between the source and intended recipient increases the level of importance of the communication signal.

The level of importance may also be determined based on the number of times a communication signal 16 is sent by the same source within a certain time frame. In this aspect, the level of importance of the communication signal 16 can increase with the number communication signals that are sent from a single source within a certain time frame. For example, if multiple successive telephone calls or text messages are sent from the same person within a particular time frame, then the next successive communication signal may have a higher level of importance than a previous one, or than a single communication signal sent within that same time frame. In an exemplary embodiment, the level of importance of each successive communication signal that is sent from the same source and within a time frame of 1 minute, increases over the previously sent communication signal.

The level of importance may also be determined based on the time of day that the communication signal 16 is sent (e.g. the level of importance of a telephone call is greater if sent between 12 midnight and 6 AM), the volume of data or content of data included in the communication signal 16 (e.g. text messages with the word "help" have higher priority than those that do not); the intended recipient of the communication signal 16 (e.g. telephone calls to occupant 20a, i.e. the driver of the vehicle 4, have a higher level of importance than those intended for the other occupants 20b-c), the number of the mobile devices 14a-14d to which the communication signal 16 is sent (e.g. a single text message sent to all of the mobile devices 14a-14d at the same time has a higher level of importance than a text message sent to just one of the mobile devices 14a-14d), other characteristics of the communication signal 16, or combinations thereof.

The level of importance may be a numeric, alphabetic, or other data value that is assigned or determined for the communication signal 16. The level of importance is then compared to a predetermined threshold in order to determine if the level of importance exceeds or satisfies the predetermined threshold. The predetermined threshold may be a numeric, alphabetic, or other data value established by the intended recipient of the communication signal 16. The type of data value used for the predetermined threshold can be the same as the type of data valued used for the level of importance so that the two values can be compared.

Determinations made at 40 as to whether the level of importance exceeds or satisfies the predetermined threshold, may be performed by the VCD 6, the network 12, or the mobile devices 14a-14d. If at 40 it is determined that the level of importance exceeds or satisfies the predetermined threshold, then the predetermined in-vehicle event is interrupted with an audible indication of the communication signal 16. The audible indication can be generated by one or more of the mobile devices 14a-14d that is a target of the communication signal 16, by an audio device in the vehicle 4 (e.g. the infotainment system 18), or a combination thereof. In one aspect, the haptic indication is not generated if the audible indication is generated. While this audible indication may cause the predetermined in-vehicle event to prematurely end, such interruption of the predetermined in-vehicle event may not be unwelcomed because the predetermined threshold was determined by the intended recipient.

If the level of importance does not exceed or satisfy the predetermined threshold, then one or more of the haptic devices 10a-10d provide the haptic indication of the communication signal 16 to one or more of the occupants 20a-20d who are the intended recipient of the communication signal 16. In one aspect, only the haptic signal is provided, and no other indication of the communication signal 16 is generated or provided to the intended recipient. Like in the method of FIG. 2 at 32, the haptic signal does not interrupt the predetermined in-vehicle event since no audible indication is generated or provided.

In an exemplary method, if the sensor 8 senses noise in the vehicle 4, this sensed noise may be transmitted as noise data to the VCD 6. The VCD 6 can operate to determine if the noise data matches data associated with a predetermined in-vehicle event, e.g. a conversation or output from the infotainment system 18. If the VCD 6 determines based on the noise data that a predetermined in-vehicle event is occurring, and detects that an incoming communication signal 16 (e.g. telephone call or text message) is sent, for example, to the mobile device 14a that is associate with the occupant 20a, then the VCD 6 can actuate the haptic device 10a to provide a haptic indication (e.g. vibration) of the communication signal 16 to the occupant 20a, who is the intended recipient of the incoming communication signal 16.

The occupant 20a feels the haptic indication (e.g. through vibration in the seat 22a) and is thus alerted to the incoming communication signal 16. In an embodiment, if the haptic indication is given to the occupant 20a, then no other indication, such as an audible indication, of the communication signal 16 is given to the occupant. This allows the occupant 20a to be alerted to the incoming communication signal 16 without the predetermined in-vehicle event being interrupted by a direct alert (e.g. ring or other audible sound) that may be normally produced by the mobile device 14a.

Suppression of the direct alert, e.g. an audible indication, may be accomplished for example, by the VCD 6 diverting the communication signal 16 from being received by the mobile device 14a and thus preventing the mobile device 14a from generating the direct alert, by the VCD 6 controlling the mobile device 14a to not generate the direct alert, or by the mobile device 14a being programmed to not generate the direct alert.

Operation of the vehicle system 2 may be similar if the communication signal 16 is sent to any of the other mobile devices 14b-14d, where haptic device 10b will vibrate if occupant 20b is the intended recipient of the communication signal 16, or haptic device 10c will vibrate if occupant 20c is the intended recipient of the communication signal 16, or haptic device 10d will vibrate if occupant 20d is the intended recipient of the communication signal 16.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle system for providing indication to an occupant of a vehicle, comprising:
a sensor sensing an occurrence or a non-occurrence of a predetermined in-vehicle event;
a detector in communication with the sensor, and detecting a communication signal sent to an in-vehicle receiver; and
a haptic device in communication with the detector;
wherein if the sensor senses the occurrence of the predetermined in-vehicle event, the haptic device gives a haptic indication of the communication signal to the occupant;
wherein if the sensor senses the non-occurrence of the predetermined in-vehicle event, the haptic device does not give the haptic indication to the occupant,
wherein the in-vehicle receiver is a separate entity from the detector,
wherein the communication signal is sent from a source that is external to the vehicle, and
wherein the occupant is an intended recipient of the communication signal.

2. The vehicle system according to claim 1, wherein if the haptic indication is given to the occupant, no other indication of the communication signal is given to the occupant.

3. The vehicle system according to claim 1, wherein the predetermined in-vehicle event is a conversation.

4. The vehicle system according to claim 1, wherein the predetermined in-vehicle event is output from an in-vehicle infotainment system.

5. The vehicle system according to claim 1, wherein:
the haptic device is located in a seat of the vehicle that is occupied by the occupant, and
the haptic indication comprises vibration in the seat.

6. The vehicle system according to claim 5, wherein:
the seat is one of a plurality of seats in the vehicle, the haptic device is one of a plurality of haptic devices, and each of the plurality of haptic devices is located in a different one of the plurality of seats in the vehicle;

the occupant is one of a plurality of occupants in the vehicle;

the plurality of occupants each occupy a different one of the plurality of seats; and the haptic device gives the haptic indication to the occupant by vibrating only the seat that is occupied by the occupant.

7. The vehicle system according to claim 6, wherein:
the in-vehicle receiver is a mobile device associated with the occupant, the communication signal is a wireless signal sent to the mobile device, and the mobile device does not give an audible indication of the communication signal to the occupant.

8. The vehicle system according to claim 1, wherein the in-vehicle receiver is integral to the vehicle system.

9. The vehicle system according to claim 1, wherein:
the detector comprises a vehicle computing device,
the sensor comprises a microphone, and
the in-vehicle receiver comprises a mobile telephone.

10. A method of providing an indication to an occupant of a vehicle, comprising:
providing a vehicle system including a sensor, a haptic device, and a detector in communication with the sensor and the haptic device;

detecting with the detector whether a communication signal is sent to an in-vehicle receiver;

sensing with the sensor whether a predetermined in-vehicle event is occurring or not occurring;

if the detector detects the communication signal is sent to the in-vehicle receiver and if the sensor senses the predetermined in-vehicle event is occurring, providing with the haptic device a haptic indication of the communication signal to the occupant; and if the detector detects the communication signal is sent to the in-vehicle receiver and if the sensor senses the predetermined in-vehicle event is not occurring, not providing with the haptic device the haptic indication of the communication signal to the occupant;

wherein the in-vehicle receiver is a separate entity from the detector, wherein the communication signal is sent from a source that is external to the vehicle, and wherein the occupant is an intended recipient of the communication signal.

11. The method according to claim 10, wherein the predetermined in-vehicle event is one selected from the group consisting of a conversation, an audio-visual output by an in-vehicle infotainment system, an audio output by the in-vehicle infotainment system, or combinations thereof.

12. The method according to claim 10, wherein:
the haptic device is located in a seat of the vehicle that is occupied by the occupant, and
the haptic indication comprises vibration in the seat.

13. The method according to claim 12, wherein:
the seat is one of a plurality of seats in the vehicle, the haptic device is one of a plurality of haptic devices, and each of the plurality of haptic devices is located in a different one of a plurality of seats in the vehicle;

the occupant is one of a plurality of occupants in the vehicle;

the plurality of occupants each occupy a different one of the plurality of seats; and the haptic device gives the haptic indication to the occupant by vibrating only the seat that is occupied by the occupant.

14. The method according to claim 12, wherein:
the in-vehicle receiver is a mobile device associated with the occupant, the communication signal is a wireless signal sent to the mobile device, and the mobile device does not give an audible indication of the communication signal to the occupant.

15. The method according to claim 10, wherein:
the detector comprises a vehicle computing device,
the sensor comprises a microphone, and
the in-vehicle receiver comprises a mobile telephone.

16. The vehicle system according to claim 1, further including an audio device, wherein if the sensor senses the non-occurrence of the predetermined in-vehicle event, the audio device gives an audible indication of the communication signal to the occupant.

17. The method according to claim 10, wherein:
a level of importance is assigned to the communication signal, the haptic device provides the haptic indication of the communication signal to the occupant only if the level of importance does not exceed or satisfy a predetermined threshold.

18. The method according to claim 17, wherein:
the vehicle system further includes an audio device; and
the method further includes if the sensor senses the predetermined in-vehicle event is not occurring or if the level of importance exceeds or satisfies the predetermined threshold, then giving with the audio device an audible indication of the communication signal to the occupant.

* * * * *